United States Patent
Rock et al.

[11] Patent Number: 5,817,391
[45] Date of Patent: Oct. 6, 1998

[54] THREE-DIMENSIONAL KNIT SPACER FABRIC FOR BED PADS

[75] Inventors: Moshe Rock, Andover, Mass.; Karl Lohmueller, Hampstead, N.H.

[73] Assignee: Malden Mills Industries, Inc., Lawrence, Mass.

[21] Appl. No.: 837,380

[22] Filed: Apr. 17, 1997

[51] Int. Cl.⁶ .............. B32B 5/26; B32B 33/00; A47G 9/00
[52] U.S. Cl. .................. 428/8.6; 5/500; 5/502; 428/95; 428/96; 428/309.9; 442/118; 442/318
[58] Field of Search .......... 5/500, 502; 428/86, 428/95, 96, 309.9; 442/118, 318

[56] References Cited

U.S. PATENT DOCUMENTS

| | | |
|---|---|---|
| 5,312,667 | 5/1994 | Lumb, et al. . |
| 5,344,698 | 9/1994 | Rock et al. . |
| 5,385,036 | 1/1995 | Spillane et al. . |
| 5,413,837 | 5/1995 | Rock et al. . |
| 5,514,428 | 5/1996 | Kunert . |
| 5,547,733 | 8/1996 | Rock et al. . |

FOREIGN PATENT DOCUMENTS

| | | |
|---|---|---|
| 0692563 | 7/1996 | European Pat. Off. . |
| WO 9516416 | 6/1995 | WIPO . |

*Primary Examiner*—James C. Cannon
*Attorney, Agent, or Firm*—Gottlieb, Rackman & Reisman, P.C.

[57] ABSTRACT

An integrated three-dimensional knit spacer fabric is provided. The fabric includes a first fabric layer, a second fabric layer, and a resilient yarn interconnecting the two layers. The first fabric layer is made from fibers rendered hydrophilic, while the second fabric layer is made from hygroscopic fibers for absorbing moisture.

15 Claims, 1 Drawing Sheet

THREE-DIMENSIONAL KNIT SPACER FABRIC FOR BED PADS

BACKGROUND OF THE INVENTION

This invention relates to a three-dimensional knit or woven fabric for bedding, and more particularly, to a three-dimensional knit or woven fabric having first and second fabric layers spaced from and connected to each other.

Prior art bedding fabrics typically comprise a thick non-integrated composite fabric. In particular, the fabric of such bedding includes an absorbent material as well as a laminate film. This design is less than desirable for use in nursing homes or hospitals, where body fluids may need to be absorbed. Typically, those fluids tend to back up. Also, air flow within the fabric is insufficient.

Accordingly, it is desirable to provide a fabric which overcomes the above disadvantages.

SUMMARY OF THE INVENTION

Generally speaking, in accordance with the invention, an integrated composite three-dimensional knit or woven spacer fabric is provided. The fabric includes a first fabric layer, a second fabric layer, and a resilient yarn interconnecting the two layers. The first fabric layer is made from fibers rendered hydrophilic, while the second fabric layer is made from hygroscopic fibers for absorbing liquid.

The three-dimensional spacer fabric of the invention may be used for bed pads. In all uses, the fabric is constructed such that the bulk ratio of the stitch and pile yarns is controlled.

It is significant that the knit fabric of the invention has a three-dimensional structure. Because of this construction, the first and the second fabric layers remain spaced from each other even under the pressure of the body supported thereon.

Accordingly, it is an object of the invention to provide an improved fabric construction for enhancing the transport of body fluids.

Another object of the invention is to provide an improved three-dimensional fabric which is sufficiently resilient.

Another object of the invention is to provide a three-dimensional fabric which functions as a spacer fabric.

Still other objects and advantages of the invention will in part be obvious, and will in part be apparent from the following description.

The invention accordingly comprises the construction having the features, properties and relation of components, as exemplified in the following detailed disclosure, and the scope of the invention will be indicated in the claims.

BRIEF DESCRIPTION OF THE DRAWINGS

For a fuller understanding of the invention, reference is made to the following description, taken in connection with the attached drawings, in which.

DETAILED DESCRIPTION OF THE PREFERRED EMBODIMENT

Figure 1:
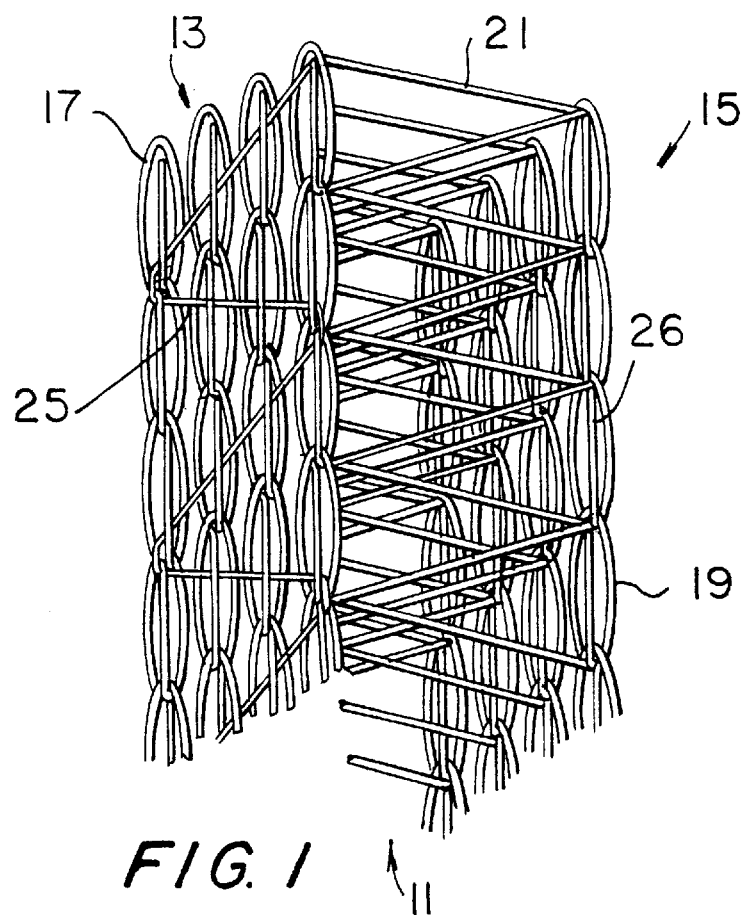
FIG. 1 is a side elevational view showing the loop structure of the spacer fabric made in accordance with the invention.
Figure 2:
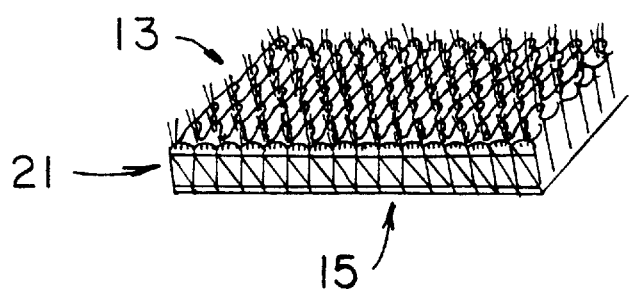
FIG. 2 is a side view of the inventive spacer fabric showing the nap face of the top fabric layer.

The double-face fabric of the invention is prepared by knitting a three-dimensional knit fabric on a double-needle bar warp knitting machine commonly used in the manufacture of velvet and well known in the art. As shown in FIGS. 1 and 2, the three-dimensional knit spacer fabric is generally indicated at 11 and includes a first fabric layer 13 made from stitch yarn 17, a second fabric layer 15 made from stitch yarn 19, and pile yarn 21 interconnecting the two layers. In addition, knit fabric 11 includes backing or lay-in yarns 25 and 26 which are held by stitch yarns 17 and 19, respectively, as shown.

In preparing the three-dimensional knit fabric of the invention, the yarn that is used is preferably a synthetic material such as polyester, acrylic or nylon. The yarn may be filament or spun, textured or fully oriented.

The yarn interconnecting the two layers of the inventive three-dimensional knit spacer fabric should have sufficient resilience and stiffness to keep the two fabric layers apart even if pressure is applied to any one of the fabric layers—in its design, the fabric can withstand between 15 and 20 pounds/square foot before collapsing. In construction, the interconnecting pile yarn may be made of either the same or different material than that of the two fabric layers. Particularly, in order to render the interconnecting pile yarn resilient, the yarn may be made of a resilient material such as monofilament or multifilament polyester, nylon, etc.

The fabric is designed to facilitate moisture transport away from the body and into an absorbent layer of hydrophilic fibers, while maintaining a comfortable top layer and air circulation next to the skin. Top layer 13 is made from fibers rendered hydrophilic to make sure that all moisture is transported through it, thus keeping its surface dry.

In particular, first fabric or top (back) layer 13 is made from a stitch yarn 17 having a fineness of between 300 and 600 denier with an individual fiber fineness in the range of between 0.3 and 2.5 dpf. The backing or lay-in yarn 25 of top layer 13 will be multifilament and will have a fineness of between 70 and 200 denier, with an individual fiber fineness of 0.5 to 5 dpf.

Preferably, stitch yarn 17 and backing yarn 25 of first fabric layer 13 are made of polyester or nylon that has been rendered hydrophilic in order to enhance the transport of body fluids and thereby maintain the skin surface dry. Particularly, layer 13 is chemically treated or utilizes modified fibers so that it is rendered hydrophilic, as described in U.S. Pat. No. 5,312,667 which is hereby incorporated by reference.

By using a chemically modified fiber or by chemically treating layer 13, the layer is rendered substantially hydrophilic. As a result, the transport of liquid from the surface, especially if the yarn fibers of layer 13 are raised, as described hereinbelow, is substantially enhanced —liquid moisture is made readily transportable along the surface of the yarn fibers of layer 13.

Preferably, the surface of fabric layer 13 is sanded, brushed or napped and comprises a raised surface fabric, with each fiber end being a conductor of moisture. Thus, fabric layer 13 will include a plurality of fibers for conducting liquid moisture therealong from the skin of the patient and eventually to second fabric layer 15, which, as described below, is highly moisture absorbent.

Pile yarn 21, which interconnects the two layers, may be a monofilament or multifilament yarn having a fineness of between 40 and 150 denier, with an individual fiber fineness of 2 to 12 dpf. It is preferred, however, that the pile yarn be monofilament in order to increase resilience. The pile yarn is made from fibers rendered hydrophilic in order to facilitate the transport of moisture from top layer 13 to layer 15.

Moreover, each of pile yarns 21 is sufficiently spaced from one another to allow air flow throughout fabric 11—this helps to prevent bed sores which can occur due to constant body pressure and limited air circulation.

Significantly, stitch yarn 17 of layer 13 is coarser than that of pile yarn 21. The yarn denier ratio of stitch yarn 17 to pile yarn 21 is between 2:1 and 12:1.

Second fabric layer 15 is made of hygroscopic fibers in order to absorb and hold a large amount of moisture. Particularly, backing yarn 26 of second fabric layer 15 is made from a moisture absorbent material such as cotton (which absorbs 2–3 times its weight of water), rayon, wool or a super absorbent fiber such as a hydrolyzed copolymer of acrylic acid (which absorbs between two and eight times its weight). In accordance with the invention, any moisture absorbent material may be used, either made from natural fibers or synthetics, so long as the yarn or fiber material chosen for layer 15 has a greater moisture absorbency then that of the fiber or yarn of layer 13.

The use of a super absorbent fiber is quite desirable in that the fibers will absorb many times their own weight, even when under pressure, and they will retain the absorbed liquid when subjected to pressure. Suitable types of super absorbent fibers are disclosed in U.S. Pat. No. 5,344,698 which is hereby incorporated by reference.

If cotton or rayon fibers are used for the second fabric layer, they may be chemically modified after knitting the composite fabric by treatment with alkylchlorides and cross-linking of the resultant ethers to form carboxymethylated cellulosic fibers, as is known to one of skill in the art, in order to render the second layer super absorbent.

Stitch yarn 19 has a fineness of between 70 and 200 denier and is multifilament, with an individual fiber fineness of between 0.5 and 5 dpf. Backing or lay-in yarn 26 is a spun yarn, with a fineness of between 20/1 and 1/1 denier (cotton system) and an individual fiber fineness of 1 to 10 dpf.

It will thus be seen that the objects set forth above, and those made apparent from the preceding description, are efficiently attained, and since certain changes may be made in the constructions described above without departing from the spirit and scope of the invention, it is intended that all matter contained in this description shall be interpreted as illustrative and not in a limiting sense.

It is also to be understood that the following claims are intended to cover all of the generic and specific features of the invention herein described, and all statements of the scope of the invention which come as a matter of language, might be said to fall therebetween.

We claim:

1. A three-dimensional knit spacer fabric comprising:
   a first fabric layer made from a first stitch yarn and a first backing yarn, a second fabric layer made from a second stitch yarn and a second backing yarn, and a pile yarn interconnecting said first and second layers;
   wherein at least one of said first stitch yarn and said first backing yarn has been rendered hydrophilic and wherein said second backing yarn is made from a moisture absorbent material.

2. The fabric of claim 1, wherein said stitch yarn has a fineness of between about 300 and 600 denier.

3. The fabric of claim 1, wherein at least one of the yarns of said first layer is chemically treated to render the yarn hydrophilic.

4. The fabric of claim 1, wherein said first fabric layer has a surface with yarn fibers that are raised.

5. The fabric of claim 1, wherein said fibers are raised by one of sanding, napping or brushing.

6. The fabric of claim 1, wherein said pile yarn has a fineness of between about 40 and 150 denier.

7. The fabric of claim 1, wherein said stitch yarn of said first layer is coarser than said pile yarn.

8. The fabric of claim 7, wherein the yarn denier ratio of said first layer stitch yarn to said pile yarn is between about 2:1 and 12:1.

9. The fabric of claim 1, wherein said pile yarn is monofilament.

10. The fabric of claim 1, wherein said pile yarn comprises fibers rendered hydrophilic.

11. The fabric of claim 1, wherein said pile yarn is spaced so that the liquid expressed from the first fabric layer flows along or in between said pile yarn.

12. The fabric of claim 1, wherein said pile yarn is sufficiently spaced in order to allow air flow through the fabric.

13. The fabric of claim 1, wherein said moisture absorbent material is selected from the group consisting of cotton, rayon, wool and a superabsorbent fiber.

14. The fabric of claim 12, wherein said superabsorbent fiber absorbs between about two and eight times its weight.

15. The fabric of claim 1, wherein the stitch yarn of said second layer has a fineness between about 70 and 200 denier.

* * * * *